Jan. 29, 1952     R. LE R. NAFZIGER     2,583,870
BREAD PAN
Filed March 14, 1950
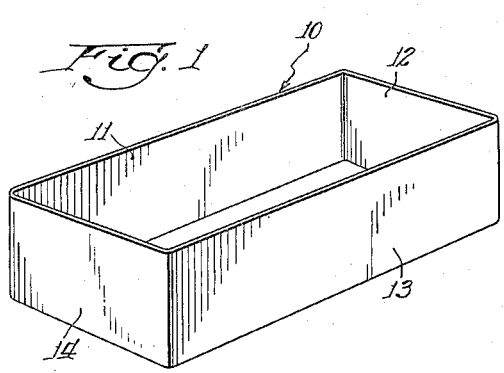
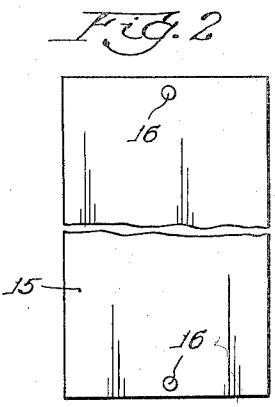
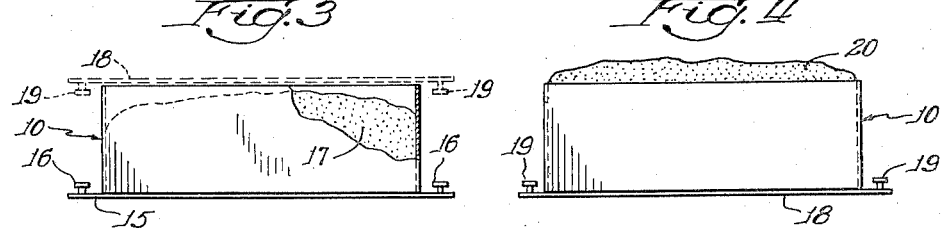
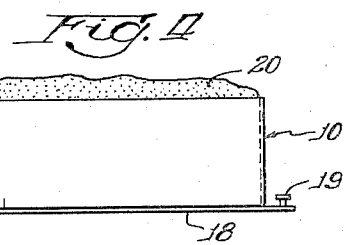
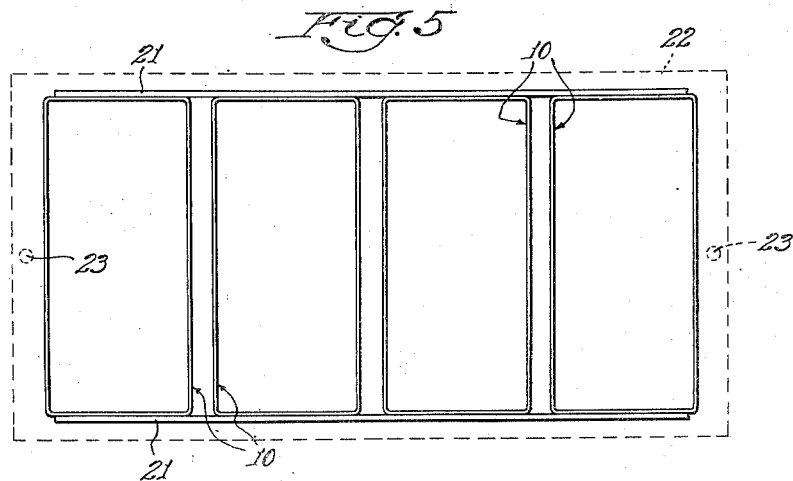
Inventor:
Ralph LeRoy Nafziger
By: Jones Tesch & Darbo
Atty.

Patented Jan. 29, 1952

2,583,870

UNITED STATES PATENT OFFICE 2,583,870

BREAD PAN

Ralph Le Roy Nafziger, Los Angeles, Calif.

Application March 14, 1950, Serial No. 149,523

1 Claim. (Cl. 220—4)

This invention relates to bread pan means more particularly for bread baking on a commercial scale.

See also my Patent No. 2,495,469, issued January 24, 1950, on "Art of Baking."

It is well-known that the use of baker-made bread is increasing, and that efforts are constantly being made to improve the quality of commercially baked bread while at the same time enhancing the attractiveness of its appearance.

The present invention is characterized by a simple but novel means for use in the baking of bread which has been found to contribute markedly to the production of a good loaf of bread while effecting radical improvement in both the interior texture of the loaf and in the appearance and edibility of the surface or crust, a loaf of bread baked by the present invention having in fact a distinctive texture and crust, the texture being both finer and more uniform throughout and the crust having a unique golden and attractive rather mottled color, the loaf being thus pleasing to the sight, palatable, and easy of digestion and assimilation, as well as nutritious.

It is well-known that during the conventional step of baking which is known as "proofing," the dough, after having been divided and coming from the molder or other preparatory apparatus, is placed in a pan and left to "proof" in a mildly warm temperature, during which time the dough rises somewhat under the fermenting action of the dough ingredients. This conventional proofing of the dough starts the aeration of the dough, which is further completed in the later step of baking, with the concurrent formation of carbonic acid gas and air cells in the dough which gives it desirable lightness and springiness. If the dough is underproofed, the gluten is frequently not stretched enough so as to permit the formation of this cellular texture and the resulting loaf will be somewhat soggy and heavy. If, on the other hand, the dough is excessively proofed, the gluten will frequently be stretched too much through over-expansion and will not be strong enough to retain its springiness during the further expansion of the carbonic acid gas and air in the dough during baking and thus the loaf may lose its desirable cellular texture.

During such proofing (of an apportioned amount of dough in each pan for an individual loaf of bread), to a desirable extent or what is commonly known as a somewhat "short" proof (since there is usually a greater danger of the bread being unfavorably affected by overproofing than by underproofing), there is a tendency for the carbonic acid gas and air produced by the dough fermentation to be occluded or dissolved in the moisture of the dough, a certain recognized moisture content thereof being of course necessary and desirable. This moisture in the dough, while it is standing during proofing, tends to gravitate to that portion of the dough which is nearest the bottom of the pan.

I have found that if the dough so formed and proofed be turned upside down after proofing and the bread baked in this reversed position from that which it occupied during proofing, the more or less wet portion of the dough formed along the bottom of the pan will now be uppermost during baking, and this wetter portion of the dough thus will receive the benefit of the higher temperature to which the uppermost part of the dough is subjected to during baking by reason of the heat radiated from the walls of the oven. Consequently air and carbonic acid gas previously dissolved or otherwise occluded in this portion of the dough will be desirably vaporized and separated from the moisture and permitted to perform their desired function of aerating the loaf and contributing to its desirable characteristics already referred to. Thus the texture of the loaf will be finer and more uniform while at the same time the usual caramelization of the sugar in the crust, and particularly the upper crust (which sugar is likely to be associated in larger quantity with the moisture in the dough) will be enhanced, thus giving the crust the desirable characteristics previously referred to for the latter. At the same time excessive formation of dextrines on the upper crust of the loaf, which frequently give the crust an undesirable glaze, will be minimized.

I will now describe illustrative means embodying my invention, it being understood that it is sufficient for the present purposes to describe only that which is new in the present invention and by which the latter is characterized, and for such purposes reference may be had to the accompanying drawings, forming a part of the present specification, and in which—

Figure 1 is a perspective view showing a pan-like frame, or bottom-less and top-less bread pan, following the present invention;

Figure 2 is a plan view of a plate employable with the invention, the plate being shown broken away to save space in the drawing;

Figure 3 shows a side elevational view of the pan of Figure 1, into which a quantity of dough apportioned for a loaf of bread has been placed for proofing and associated with the plate upon which the dough and frame rest during proofing, the broken lines in this figure indicating another similar plate, which may be subsequently employed;

Figure 4 is a view similar to Figure 3 but showing the frame and dough of Figure 2 now turned upside down and resting upon a second plate, which is shown in broken lines in Figure 2, the plate shown in full lines in Figure 2 being removed; and Figure 5 is a view showing the adaptation of the invention to a battery of frames or pans secured together, for convenience in handling.

Referring in detail to the illustrations of the drawings and in accordance with the present invention, the pan-like frame 10 may be of metal construction and may be specially constituted for the purpose, preferably having parallel walls, as here shown, or might be formed by cutting out the bottom of a conventional baking pan. In either case, it will thus have only the laterally facing walls 11, 12, 13 and 14 and without any top or bottom.

The plate 15 may also be of metal, of sufficient area to wholly underlie the frame 10 and to extend slightly beyond it for convenience in handling, as shown in Figure 3. The plate need be only thick enough to give it the desired rigidity so that the plate and frame with the dough therein as next described, may be handled as a unit. The plate may if desired have lugs 16 at each end by which it may be picked up conveniently, the lugs 16 being adjacent the margin of the plate whereby the frame 10 may be located on the plate 15 therebetween.

When now the frame 10 is superimposed on the plate 15, as shown in Figure 3, the apportioned amount of dough for an individual loaf of bread is then placed in the frame, which, in cooperation with the plate 15, functions somewhat as a pan. Thereupon the dough is left to proof, as already referred to, and will, after proofing, occupy a position somewhat as shown at 17 of Figure 3, the proofing being stopped short of the point where the dough would rise above the upper edge of the frame 10.

Next, another plate 18, identical with the plate 15 and having if desired lugs 19 for handling, is placed over the frame 10 with the proofed dough 17 therein. In this case, the lugs 19 would be faced downwardly, whereupon the whole, including the plate 15, the frame 10 with the proofed dough 17 therein, and the plate 18, is turned upside down, with now the plate 18 on the bottom as indicated in Figure 4, the plate 15 being thereupon removed. The dough being still flowable, will sink along the walls of the frame to fill out, somewhat squarely, the lower part of the frame.

Finally, the plate 18 with the frame 10 carried thereon and containing the proofed dough 17, is placed in the oven and baked in the usual way whereby the dough 17 will rise further during baking and will become the baked loaf 20, during which the carbonic acid gas and air which was formerly occluded or dissolved in the excess moisture in the dough at the bottom of the pan but which is now on top, will be vaporized and expanded by the enhanced radiated heat which the upper part of the loaf receives during baking and will contribute to the improved results already referred to. After the completion of the baking step, the loaf 20 may be removed from the frame 10 and put through the usual bread-wrapping machine or handled in any other conventional way as may be desired.

It has been found that bread so prepared and baked is markedly superior to bread prepared in the customary way without being turned upside down after proofing.

Figure 5 shows a battery of four such frames 10 connected together abreast as by metal straps 21, and in this case the plates such as 22 may be provided, similar to the plates 15 and 18, and having lugs 23 thereon for handling, but of a larger size than for the single individual frame, and slightly larger than the over-all area of the battery of four frames 10.

It will be understood that the invention is not intended to be limited to details described for purposes of illustration, and might be employed equally well in the baking of other forms of bakery products, such as rolls or the like.

The invention having been described, what is here claimed is:

Bread pan means comprising a frame having two ends and two sides without top or bottom, said ends and sides being respectively parallel, a pair of separable flat plates of substantially the same dimensions and of an area substantially larger than the area of the frame whereby to provide margins on the plates extending beyond the frame when the plates and frame are respectively superposed, a first of said plates to provide a bottom for the frame in the initial position of the frame with a portion of dough therein to be proofed, without the second plate, and the second plate to provide first a top for said frame and later a bottom therefor when said frame is inverted, for baking the dough, said first plate being then removed, and a pair of lugs on oppositely directed faces of the plates, said lugs being located on said extended margins of the plates.

RALPH LE ROY NAFZIGER.

REFERENCES CITED

The following references are of record in the file of this patent:

UNITED STATES PATENTS

| Number | Name | Date |
|---|---|---|
| 132,921 | Partz | Nov. 12, 1872 |
| 304,111 | Laube | Aug. 26, 1884 |
| 608,930 | Tuell | Aug. 9, 1898 |
| 634,003 | Kellogg | Oct. 3, 1899 |
| 1,553,617 | Katzinger | Sept. 15, 1925 |
| 1,708,304 | Elliott | Apr. 9, 1929 |
| 1,723,586 | Tarver | Aug. 6, 1929 |
| 2,257,468 | Langel | Sept. 30, 1941 |
| 2,447,126 | Kollman | Aug. 17, 1948 |